US010266266B2

(12) United States Patent
Sopper et al.

(10) Patent No.: US 10,266,266 B2
(45) Date of Patent: Apr. 23, 2019

(54) PAYLOAD DELIVERY SYSTEM WITH REMOVABLE SPOOL

(71) Applicant: Wing Aviation LLC, Mountain View, CA (US)

(72) Inventors: Clark Sopper, Mountain View, CA (US); André Prager, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 15/161,848

(22) Filed: May 23, 2016

(65) Prior Publication Data

US 2017/0334561 A1    Nov. 23, 2017

(51) Int. Cl.
  *B64D 1/22*   (2006.01)
  *B66D 5/02*   (2006.01)
  *B64C 39/02*  (2006.01)

(52) U.S. Cl.
  CPC ............. *B64D 1/22* (2013.01); *B64C 39/024* (2013.01); *B66D 5/026* (2013.01); *B64C 2201/128* (2013.01)

(58) Field of Classification Search
  CPC ...... B64D 1/02; B64D 1/22; B64C 2201/128; B66D 5/026; F16D 57/02
  See application file for complete search history.

(56) References Cited

U.S. PATENT DOCUMENTS

| | | | | | |
|---|---|---|---|---|---|
| 3,158,231 | A | * | 11/1964 | Walter | B66D 5/026 188/270 |
| 3,358,968 | A | * | 12/1967 | Walsh | B64D 1/22 254/279 |
| 3,804,371 | A | * | 4/1974 | Mills | B64D 1/22 254/336 |
| 3,809,334 | A | * | 5/1974 | Beurer | B64D 1/22 242/390.2 |
| 6,536,743 | B2 | * | 3/2003 | Selcer | B63B 21/66 254/333 |
| 8,061,483 | B2 | * | 11/2011 | Moriarty | A62B 1/12 182/231 |

(Continued)

OTHER PUBLICATIONS

Corinne Iozzio, "Google's Deliver Drones Will Airlift Supplies Practically Anywhere," smithsonian.com http://www.smithsonianmag.com/innovation/googles-delivery-drones-will-airlift-supplies-practically-anywhere-180952607/?no-ist Published Sep. 5, 2014.

(Continued)

*Primary Examiner* — Joseph W Sanderson
(74) *Attorney, Agent, or Firm* — McDonnell Boehnen Hulbert & Berghoff LLP

(57) ABSTRACT

An apparatus may include (i) a support structure, (ii) at least one shaft coupled to the support structure via at least one swing arm, wherein the swing arm allows upward movement, and restricts downward movement, of the at least one shaft from a resting position, (iii) a spool, wherein in the spool is shaped so as to rest on the at least one shaft when the at least one shaft is in the resting position, and wherein the spool is operable to unwind a tether coupled to a payload, and (iv) at least one fan coupled to the at least one shaft, wherein rotation of the spool when unwinding the tether also causes rotation of the at least one fan coupled to the at least one shaft, thereby controlling a descent rate of the payload.

15 Claims, 12 Drawing Sheets

(56) References Cited

U.S. PATENT DOCUMENTS

| | | | |
|---|---|---|---|
| 9,321,531 B1 | 4/2016 | Takayama et al. | |
| 2002/0166998 A1* | 11/2002 | Selcer .................. | B63B 21/66 |
| | | | 254/333 |
| 2004/0173726 A1 | 9/2004 | Mercadal et al. | |
| 2007/0240940 A1* | 10/2007 | Moriarty ................ | A62B 1/12 |
| | | | 182/238 |
| 2009/0026780 A1 | 1/2009 | Claraz et al. | |
| 2010/0072156 A1 | 3/2010 | Mentink et al. | |
| 2015/0120094 A1 | 4/2015 | Kimchi et al. | |
| 2015/0158587 A1 | 6/2015 | Patrick et al. | |
| 2015/0298786 A1 | 10/2015 | Stigler et al. | |
| 2016/0059963 A1 | 3/2016 | Burgess et al. | |

OTHER PUBLICATIONS

International Searching Authority, International Search Report and Written Opinion dated Jun. 26, 2017, issued in connection with International Application No. PCTUS2017023886, filed on Mar. 23, 2017, 14 pages.

\* cited by examiner

PAYLOAD DELIVERY SYSTEM WITH REMOVABLE SPOOL

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An unmanned aerial vehicle (UAV) is disclosed that includes a payload delivery system or apparatus. The payload delivery apparatus may lower a payload to the ground by securing the payload during descent and releasing the payload upon reaching the ground. A payload may be any object, such as a box, that can be carried and lowered to the ground by a UAV.

In one aspect, an example payload delivery apparatus may include: (i) a support structure; (ii) at least one shaft coupled to the support structure via at least one swing arm, wherein the swing arm allows upward movement, and restricts downward movement of, the at least one shaft from a resting position; (iii) a spool, wherein in the spool is shaped so as to rest on the at least one shaft when the at least one shaft is in the resting position, and wherein the spool is operable to unwind a tether coupled to a payload; and (iv) at least one fan coupled to the at least one shaft, wherein rotation of the spool when unwinding the tether also causes rotation of the at least one fan coupled to the at least one shaft, thereby controlling a descent rate of the payload.

In another aspect, an example payload delivery apparatus may include: (i) a support structure; (ii) at least one shaft coupled to the support structure via at least one swing arm, wherein the swing arm allows upward movement, and restricts downward movement of, the at least one shaft from a resting position; (iii) a spool, wherein in the spool is shaped so as to rest on the at least one shaft when the at least one shaft is in the resting position, and wherein the spool is operable to unwind a tether coupled to a payload; and (iv) wherein the at least one swing arm is configured to (a) move the at least one shaft upward while the spool passes through the opening of the support structure and (b) move the at least one shaft back to the resting position so that the spool rests on the at least one shaft.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
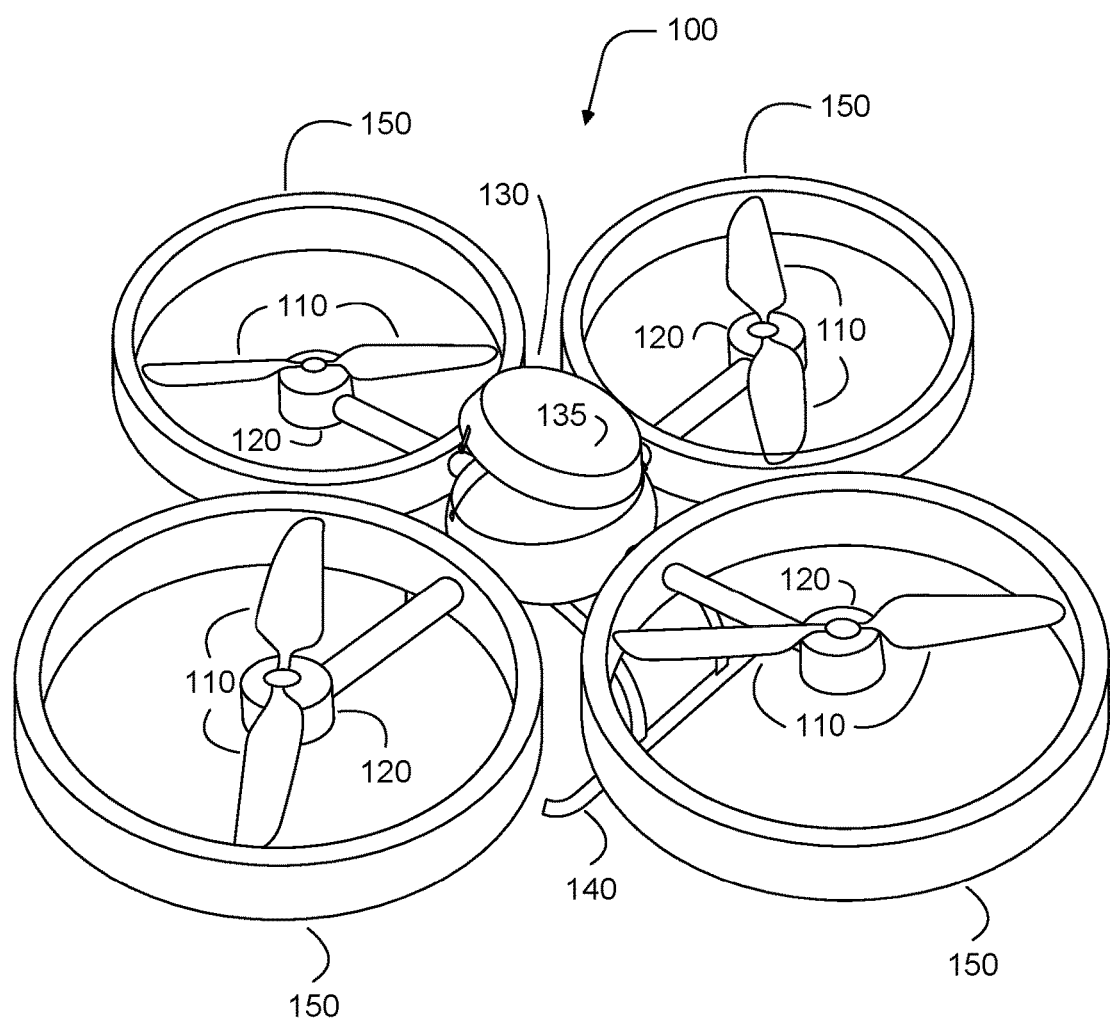
FIGS. 1, 2, 3, and 4 are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative embodiments described herein are not meant to be limiting. Other embodiments may be utilized, and other changes may be made, without departing from the scope of the subject matter presented herein. It will be readily understood that the aspects of the present disclosure, as generally described herein, can be arranged, substituted, combined, separated, and designed in a wide variety of different configurations, all of which are explicitly contemplated herein.

I. Overview

Example embodiments may relate to and/or be implemented in a system in which unmanned vehicles, and in particular, "unmanned aerial vehicles" (UAVs), are configured to deliver payloads at delivery locations. UAVs in such a system may operate in an autonomous or semi-autonomous delivery system in which the UAV carries a payload from a first location, such as a distribution center, to a delivery location, such as a residence or business. At the distribution center, the UAV can be loaded with the payload to be delivered, and then the UAV can navigate to the delivery location. The UAV can then transition to a hover mode while situated above the delivery location.

While hovering, the UAV can autonomously deliver the payload using a payload delivery apparatus that lowers the payload to the ground while the UAV hovers above. The payload delivery apparatus may include a spool configured to unwind a tether that is coupled to the payload to lower the payload to the ground (along with the tether).

Additionally, the payload delivery apparatus may include a support structure that keeps the components of the payload delivery apparatus together. For example, a shaft may be coupled to the support structure via a swing arm. The swing arm may be coupled in a manner such that it allows upward movement, and restricts downward movement of, the shaft from a resting position. The payload delivery apparatus may be in a resting position when a UAV is in flight mode or in hover mode. In some embodiments, the shaft may include rubber on the ends of the shaft. The spool may rest on the rubber ends of the shaft when the payload delivery apparatus is in the resting position.

Additionally, the payload delivery apparatus may include one or more fans coupled to the shaft. The fans may control the speed or descent rate at which the payload is lowered. To reduce size, weight, and cost in manufacturing and operating the UAV, the payload delivery apparatus (and components thereof) may be made of plastic or other lightweight materials. For example, one or more fans of the payload delivery apparatus may be made of plastic to passively (non-powered) control the descent rate of the payload to the ground. Such fans made of passive components may have the benefit of functioning like a traditional electric motor, while reducing the size, weight, and cost of the UAV.

In operation, when a payload is released from a UAV via the payload delivery apparatus, the shaft may act as a friction drive or a friction engine. The spool may then transfer power to the shaft, and the spool may rotate and unwind the tether to lower the payload to the ground for delivery. Together, the spool and the shaft, while remaining passive (non-powered), functions like a traditional gearbox, ensuring that one or more fans rotate at the desired speed. While the payload descends from the UAV, the one or more fans may dissipate the potential energy possessed by the payload that was held from the UAV. The one or more fans of the payload delivery apparatus may control the rate at which it dissipates the potential energy in a polynomial or quadratic manner, rather than a linear manner, so that a payload that weighs twice as much as another payload does not descend twice as fast as the other payload. Controlling the speed or descent rate of the payload in such manner ensures consistent and stable delivery of the payload to the ground, which further enhances a user or customer's experience.

The payload can be secured to the payload delivery apparatus in a variety of ways. In some examples, the payload includes a payload mount attachment on its top surface. The payload mount attachment can be a loop extending from the top surface, a hook, or a structure with an aperture. The payload mount attachment can be coupled to the tether of the payload delivery apparatus.

After a payload is delivered (and the tether fully unwinds off of the spool), the UAV may need to navigate back to the distribution center to load a new payload. At the distribution center, the UAV may need to replace the empty spool, attach a new payload to a new spool, and load the new spool on the payload delivery apparatus of the UAV before navigating to a new delivery location. To simplify this process, a new spool that may be pre-attached to a new payload (via a new tether) may be pushed into the position of the empty spool, thereby removing the empty spool and replacing the empty spool in one step. For example, the new spool may be inserted from below through an opening in the support structure of the payload delivery apparatus. While the new spool passes through the opening of the support structure, the shaft may swing upward to remove the empty spool that was resting on top of the shaft. After the new spool passes through the opening of the support structure (and removes the empty spool), the shaft may then move back to its resting position, so that the new spool rests on top of the shaft in place of the empty spool. Because this loading mechanism and process takes place using passive components (non-powered) without the use of powered components to remove the empty spool or load the new spool, the process further reduces the cost of the UAV to deliver payloads and load new payloads for delivery. This loading mechanism and process, using one or more swing arms and shafts of the payload delivery apparatus, is described in further detail herein.

II. Example Unmanned Vehicles

Herein, the terms "unmanned aerial vehicle" and "UAV" refer to any autonomous or semi-autonomous vehicle that is capable of performing some functions without a physically present human pilot. Examples of flight-related functions may include, but are not limited to, sensing its environment or operating in the air without a need for input from an operator, among others.

A UAV may be autonomous or semi-autonomous. For instance, some functions may be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 110 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
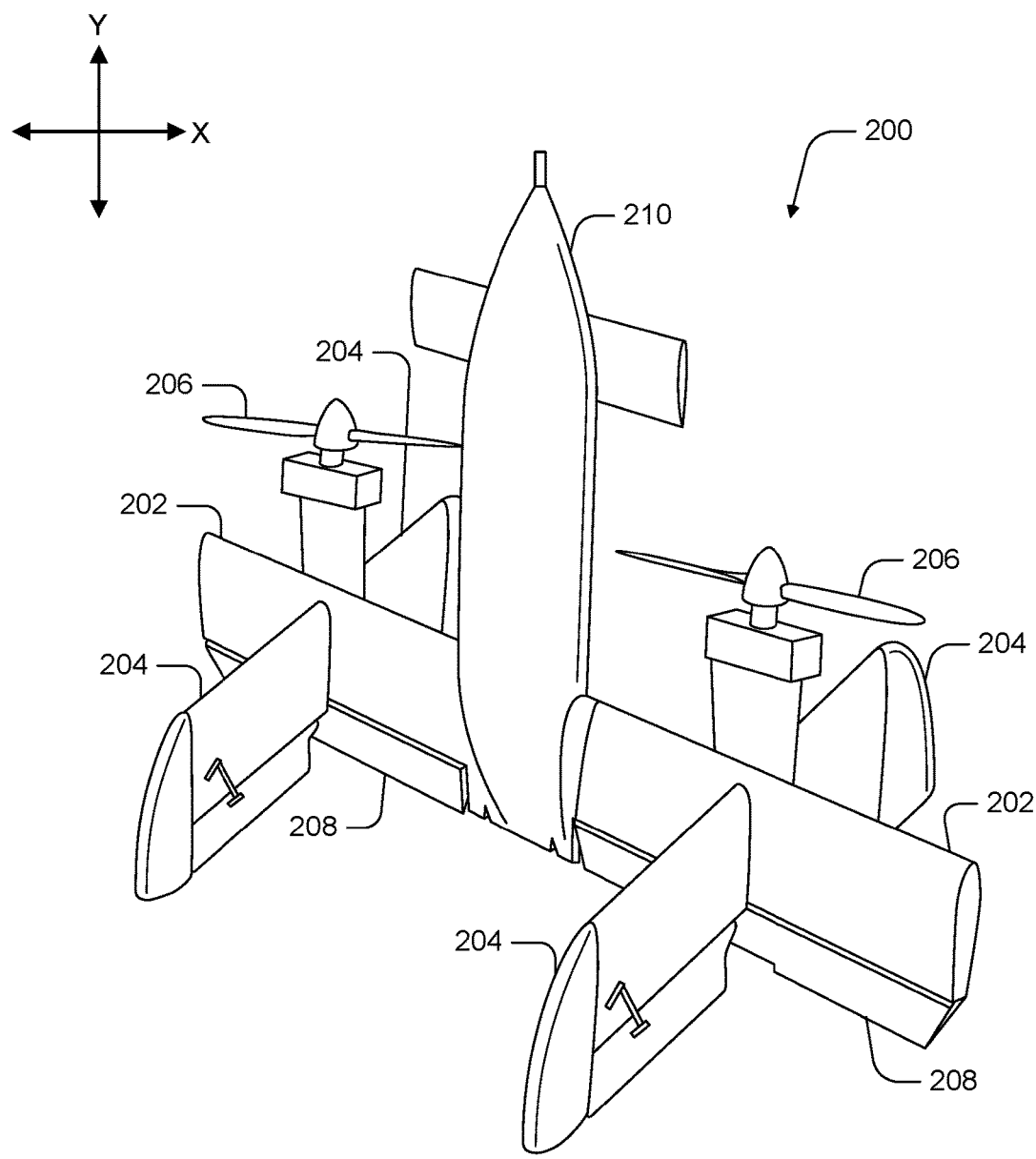

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3 and 4 are simplified illustrations of other types of UAVs, according to example embodiments.

Figure 3:
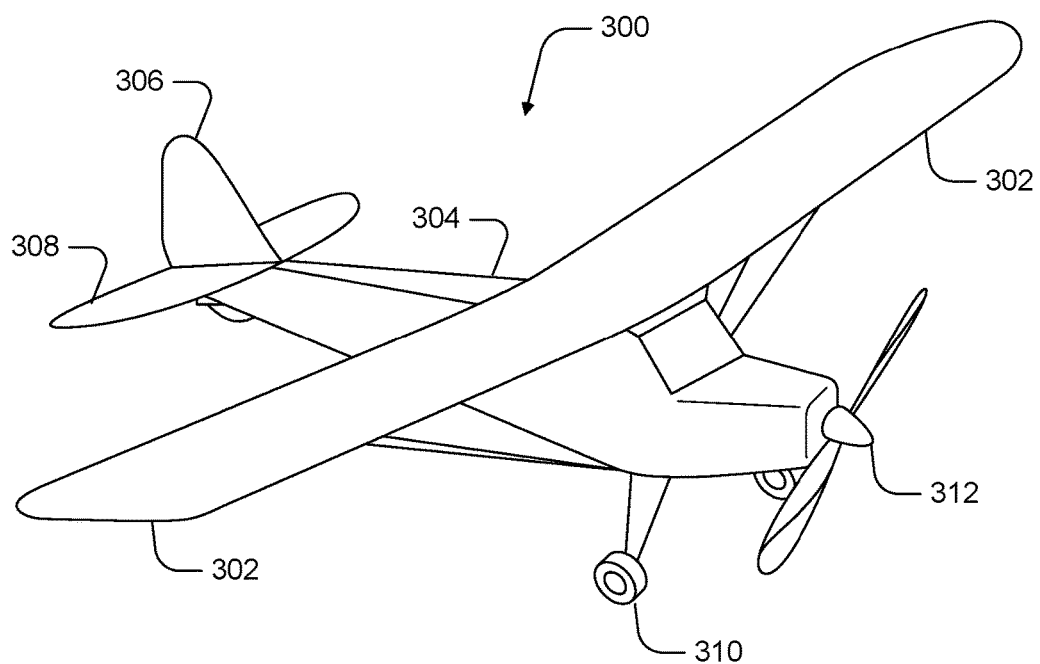

In particular, FIG. 3 shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3 depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 4:
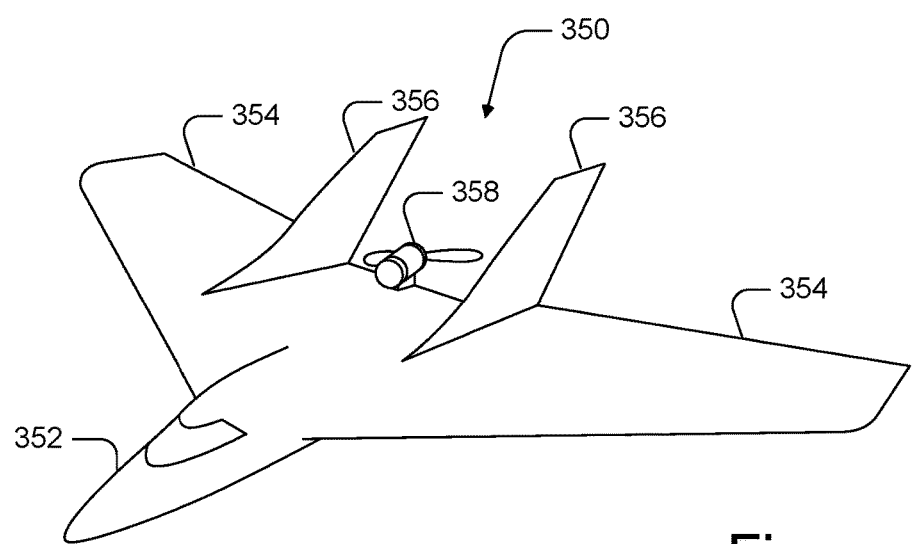

FIG. 4 shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3, FIG. 4 depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems. A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized for delivery. Such vehicles may include, for example, unmanned ground vehicles (UGVs), unmanned space vehicles (USVs), and/or unmanned underwater vehicles (UUVs). A UGV may be a vehicle, which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. Example UAV Systems

Figure 5:
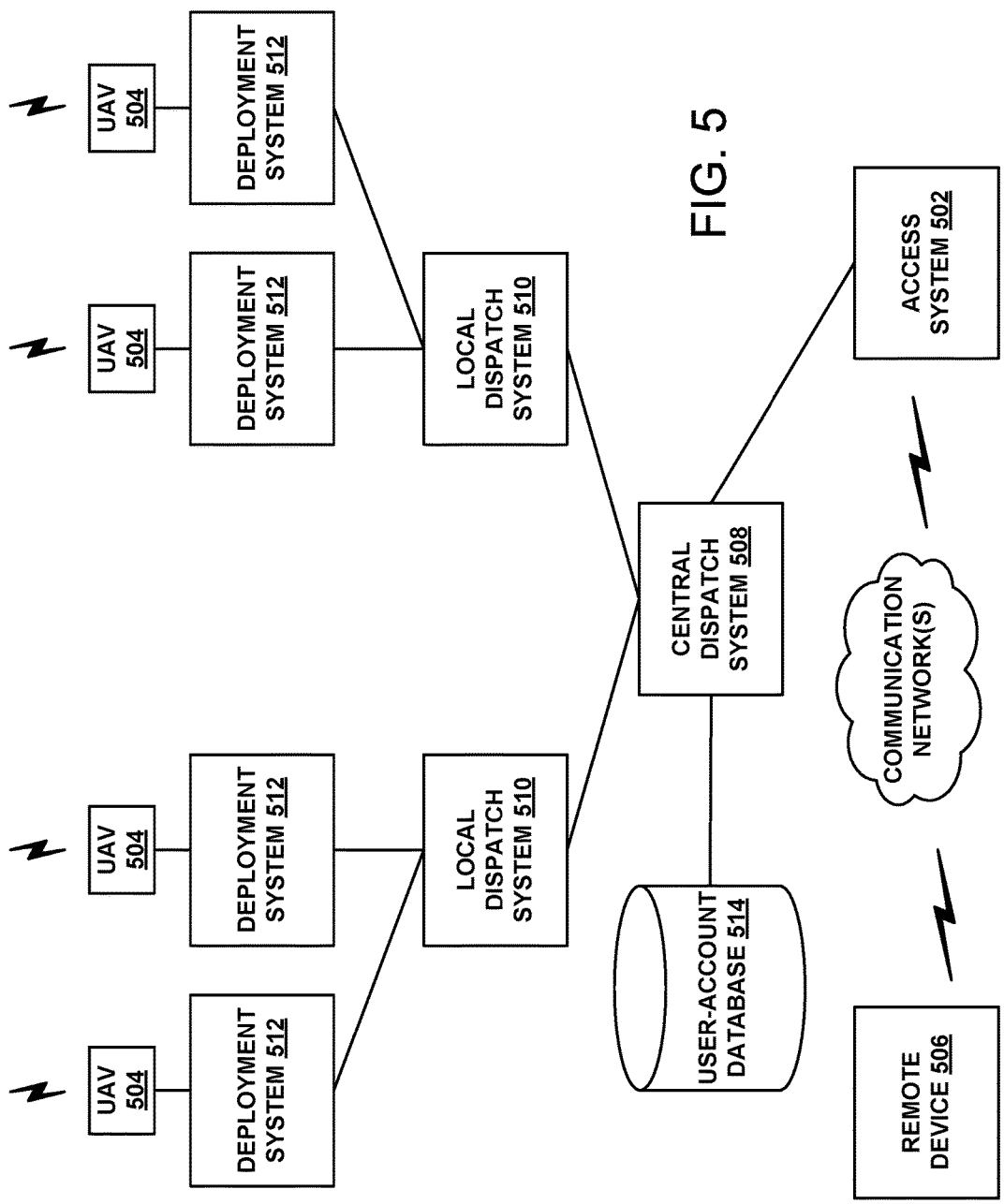
FIG. 5 is a simplified block diagram illustrating a UAV system, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 5 is a simplified block diagram illustrating a distributed UAV system 500, according to an example embodiment.

In an illustrative UAV system 500, an access system 502 may allow for interaction with, control of, and/or utilization of a network of UAVs 504. In some embodiments, an access system 502 may be a computing system that allows for human-controlled dispatch of UAVs 504. As such, the control system may include or otherwise provide a user interface (UI) 503 via which a user can access and/or control UAVs 504. In some embodiments, dispatch of UAVs 504 may additionally or alternatively be accomplished via one or more automated processes.

Further, an access system 502 may provide for remote operation of a UAV. For instance, an access system 502 may allow an operator to control the flight of a UAV via user interface (UI). As a specific example, an operator may use an access system to dispatch a UAV 504 to deliver a package to a target location, or to travel to the location of a medical situation with medical-support items. The UAV 504 may then autonomously navigate to the general area of the target location. At this point, the operator may use the access system 502 to take over control of the UAV 504, and navigate the UAV to the target location (e.g., to a particular person to whom a package is being sent). Other examples of remote operation of a UAV are also possible.

In an illustrative embodiment, UAVs 504 may take various forms. For example, each UAV 504 may be a UAV such as those illustrated in FIGS. 1, 2, 3, and 4. However, medical support system 500 may also utilize other types of UAVs without departing from the scope of the invention. In some implementations, all UAVs 504 may be of the same or a similar configuration. However, in other implementations, UAVs 504 may include a number of different types of UAVs. For instance, UAVs 504 may include a number of types of UAVs, with each type of UAV being configured for a different type or types of medical support.

A remote device 506 may take various forms. Generally, a remote device 506 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 506 may be a mobile phone, tablet computer, laptop computer, personal computer, or any network-connected computing device. Further, in some instances, remote device 506 may not be a computing device. As an example, a standard telephone, which allows for communication via plain old telephone service (POTS), may serve as a remote device 506. Other types of remote devices are also possible.

Further, a remote device 506 may be configured to communicate with access system 502 via one or more types of communication network(s) 514. For example, a remote device 506 could communicate with access system 502 (or via a human operator of the access system) by placing a phone call over a POTS network, a cellular network, and/or a data network such as the Internet. Other types of networks may also be utilized.

In some embodiments, a remote device 506 may be configured to allow a user to request delivery of one or more items to a desired location. For example, a user could request UAV delivery of a package to their home via their mobile phone, tablet, or laptop. As another example, a user could request dynamic delivery to whatever location they are at the time of delivery. To provide such dynamic delivery, a UAV system 500 may receive location information (e.g., GPS coordinates, etc.) from the user's mobile phone, or any other device on the user's person, such that a UAV can navigate to the user's location (as indicated by their mobile phone).

In some embodiments, a remote device 506 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 502 to dispatch a UAV 504.

As noted, a remote device 506 may be configured to determine and/or provide an indication of its own location. For example, remote device 506 may include a GPS system so that it can include GPS location information (e.g., GPS coordinates) in a communication to an access system 502 and/or to a dispatch system such as central dispatch system 508. As another example, a remote device 506 may use a technique that involves triangulation (e.g., between base stations in a cellular network) to determine its location. Alternatively, another system such as a cellular network may use a technique that involves triangulation to determine the location of a remote device 506, and then send a location message to the remote device 506 to inform the remote device of its location. Other location-determination techniques are also possible.

In an illustrative arrangement, central dispatch system 508 may be a server or group of servers, which is configured to receive dispatch messages requests and/or dispatch instructions from an access system 502. Such dispatch messages may request or instruct the central dispatch system 508 to coordinate the deployment of UAVs to various target locations. A central dispatch system 508 may be further configured to route such requests or instructions to local dispatch systems 510. To provide such functionality, central dispatch system 508 may communicate with access system 502 via a data network, such as the Internet or a private network that is established for communications between access systems and automated dispatch systems.

In the illustrated configuration, central dispatch system 508 may be configured to coordinate the dispatch of UAVs 504 from a number of different local dispatch systems 510. As such, central dispatch system 508 may keep track of which UAVs 504 are located at which local dispatch systems 510, which UAVs 504 are currently available for deployment, and/or which services or operations each of the UAVs 504 is configured for (in the event that a UAV fleet includes multiple types of UAVs configured for different services and/or operations). Additionally or alternatively, each local dispatch system 510 may be configured to track which of its associated UAVs 504 are currently available for deployment, and/or to track which services or operations each of its associated UAVs is configured for.

In some cases, when central dispatch system 508 receives a request for UAV-related service from an access system 502, central dispatch system 508 may select a specific UAV 504 to dispatch. The central dispatch system 508 may accordingly instruct the local dispatch system 510 that is associated with the selected UAV to dispatch the selected UAV. The local dispatch system 510 may then operate its associated deployment system 512 to launch the selected UAV. In other cases, a central dispatch system 508 may forward a request for a UAV-related service to a local dispatch system 510 that is near the location where the support is requested, and leave the selection of a particular UAV 504 to the local dispatch system 510.

In some embodiments, each deployment system 512 may take the form of a nest or possibly multiple nests, such as the illustrative nests described herein. Alternatively, a each nest could include one or more deployment systems 512. In other configurations, a nest may include or provide some or all of the functionality of a local dispatch system 510 and/or a central dispatch system 508. It should be understood, however, that a nest may additionally or alternatively provide other functionality and/or include other systems.

In an example configuration, a local dispatch system 510 may be implemented in a computing system at the same location as the deployment system or systems 512 that it controls. For example, in some embodiments, a local dispatch system 510 could be implemented by a computing system at a building, such as a fire station, where the deployment systems 512 and UAVs 504 that are associated with the particular local dispatch system 510 are also located. In other embodiments, a local dispatch system 510 could be implemented at a location that is remote to its associated deployment systems 512 and UAVs 404.

Numerous variations on and alternatives to the illustrated configuration of medical support system 500 are possible. For example, in some embodiments, a user of a remote device 506 could request medical support directly from a central dispatch system 508. To do so, an application may be implemented on a remote device 506 that allows the user to provide information regarding a requested service, and generate and send a data message to request that the UAV system provide the service. In such an embodiment, central dispatch system 508 may include automated functionality to handle requests that are generated by such an application, evaluate such requests, and, if appropriate, coordinate with an appropriate local dispatch system 510 to deploy a UAV.

Further, in some implementations, some or all of the functionality that is attributed herein to central dispatch system 508, local dispatch system(s) 510, access system 502, and/or deployment system(s) 512 could be combined in a single system, implemented in a more complex system, and/or redistributed among central dispatch system 508, local dispatch system(s) 510, access system 502, and/or deployment system(s) 512 in various ways.

Yet further, while each local dispatch system 510 is shown as having two associated deployment systems, a given local dispatch system 510 may have more or less associated deployment systems. Similarly, while central dispatch system 508 is shown as being in communication with two local dispatch systems 510, a central dispatch system may be in communication with more or less local dispatch systems 510.

In a further aspect, a deployment system 512 may take various forms. In general, a deployment system may take the form of or include a system for physically launching a UAV 504. Such a launch system may include features that allow for a human-assisted UAV launch and/or features that provide for an automated UAV launch. Further, a deployment system 512 may be configured to launch one particular UAV 504, or to launch multiple UAVs 504.

A deployment system 512 may further be configured to provide additional functions, including for example, diagnostic☐related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 512 and their corresponding UAVs 504 (and possibly associated local dispatch systems 510) may be strategically distributed throughout an area such as a city. For example, deployment systems 512 may be located on the roofs of certain municipal buildings, such as fire stations, which can thus serve as the dispatch locations for UAVs 504. Fire stations may function well for UAV dispatch, as fire stations tend to be distributed well with respect to population density, their roofs tend to be flat, and the use of firehouse roofs as leased spaces for UAV dispatch could further the public good. However, deployment systems 512 (and possibly the local dispatch systems 510) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 500 may include or have access to a user-account database 514. The user-account database 514 may include data for a number of user-accounts, and which are each associated with one or more person. For a given user-account, the user-account database 514 may include data related to or useful in providing UAV-related services. Typically, the user data associated with each user-account is optionally provided by an associated user and/or is collected with the associated user's permission.

Further, in some embodiments, a person may have to register for a user-account with the UAV system 500 in order to use or be provided with UAV-related services by the UAVs 504 of medical-support system 500. As such, the user-account database 514 may include authorization information for a given user-account (e.g., a user-name and password), and/or other information that may be used to authorize access to a user-account.

In some embodiments, a person may associate one or more of their devices with their user-account, such that they can be provided with access to the services of UAV system 500. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. Example Components of a UAV

Figure 6:
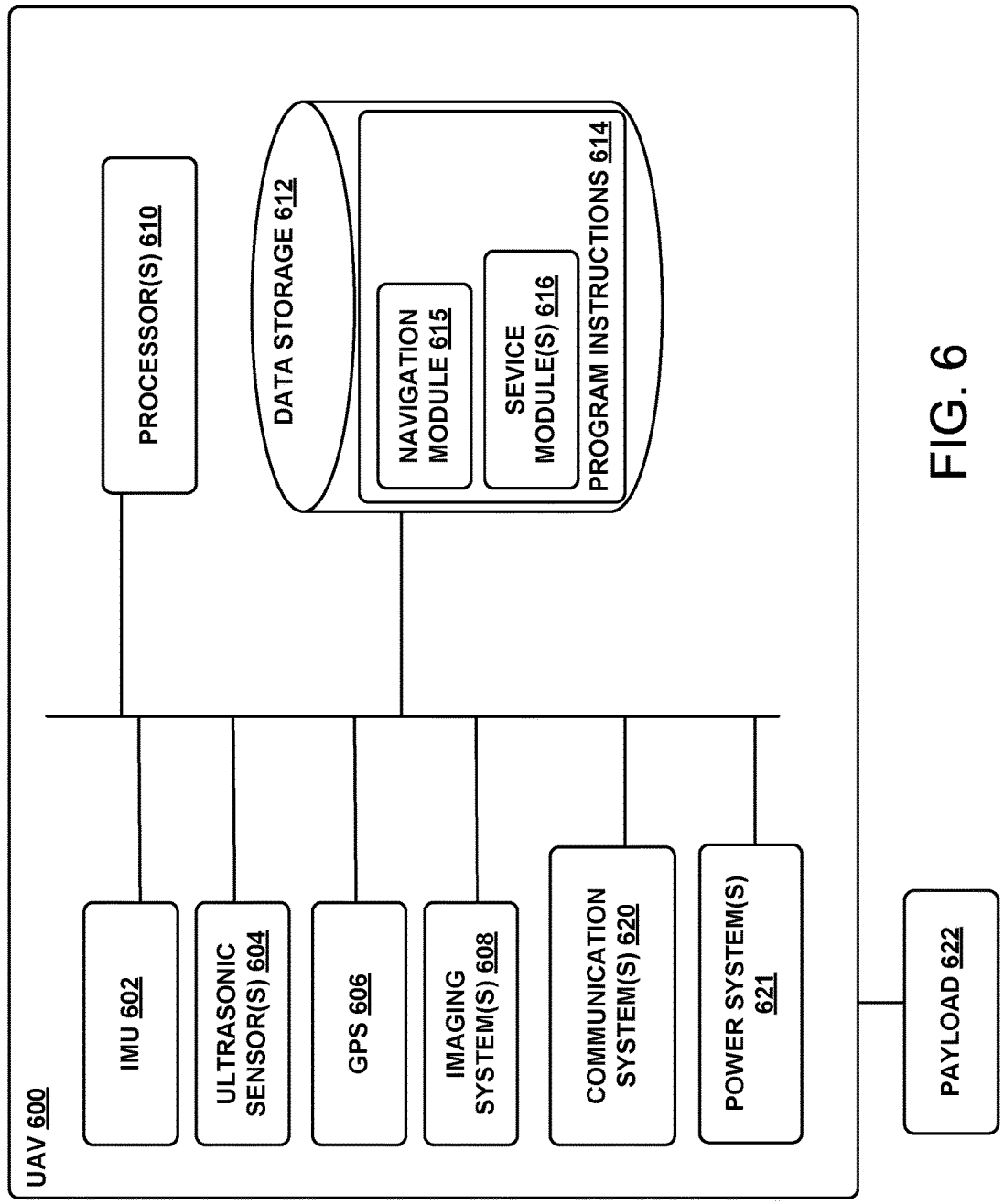
FIG. 6 is a simplified block diagram illustrating components of an unmanned aerial vehicle, according to an example embodiment.

FIG. 6 is a simplified block diagram illustrating components of a UAV 600, according to an example embodiment. UAV 600 may take the form of, or be similar in form to, one of the UAVs 100, 200, 300, and 350 described in reference to FIGS. 1, 2, 3, and 4. However, a UAV 600 may also take other forms.

UAV 600 may include various types of sensors, and may include a computing system configured to provide the functionality described herein. In the illustrated embodiment, the sensors of UAV 600 include an inertial measurement unit (IMU) 602, ultrasonic sensor(s) 604, GPS 606, imaging system(s) 608, among other possible sensors and sensing systems.

In the illustrated embodiment, UAV 600 also includes one or more processors 610. A processor 610 may be a general-purpose processor or a special purpose processor (e.g., digital signal processors, application specific integrated circuits, etc.). The one or more processors 610 can be configured to execute computer-readable program instructions 614 that are stored in the data storage 612 and are executable to provide the functionality of a UAV described herein.

The data storage 612 may include or take the form of one or more computer-readable storage media that can be read or accessed by at least one processor 610. The one or more computer-readable storage media can include volatile and/or non-volatile storage components, such as optical, magnetic, organic or other memory or disc storage, which can be integrated in whole or in part with at least one of the one or more processors 610. In some embodiments, the data storage 612 can be implemented using a single physical device (e.g., one optical, magnetic, organic or other memory or disc storage unit), while in other embodiments, the data storage 612 can be implemented using two or more physical devices.

As noted, the data storage 612 can include computer-readable program instructions 614 and perhaps additional data, such as diagnostic data of the UAV 600. As such, the data storage 614 may include program instructions to perform or facilitate some or all of the UAV functionality described herein. For instance, in the illustrated embodiment, program instructions 614 include a navigation module 615 and one or more service modules 616.

A. Sensors

In an illustrative embodiment, IMU 602 may include both an accelerometer and a gyroscope, which may be used together to determine the orientation of the UAV 600. In particular, the accelerometer can measure the orientation of the vehicle with respect to earth, while the gyroscope measures the rate of rotation around an axis. IMUs are commercially available in low-cost, low-power packages. For instance, an IMU 602 may take the form of or include a miniaturized MicroElectroMechanical System (MEMS) or a NanoElectroMechanical System (NEMS). Other types of IMUs may also be utilized.

An IMU 602 may include other sensors, in addition to accelerometers and gyroscopes, which may help to better determine position and/or help to increase autonomy of the UAV 600. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 600, slight errors in measurement may compound over time and result in a more significant error. However, an example UAV 600 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 600 may also include a pressure sensor or barometer, which can be used to determine the altitude of the UAV 600. Alternatively, other sensors, such as sonic altimeters or radar altimeters, can be used to provide an indication of altitude, which may help to improve the accuracy of and/or prevent drift of an IMU.

In a further aspect, UAV 600 may include one or more sensors that allow the UAV to sense objects in the environment. For instance, in the illustrated embodiment, UAV 600 includes ultrasonic sensor(s) 604. Ultrasonic sensor(s) 604 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 600 also includes a GPS receiver 606. The GPS receiver 606 may be configured to provide data that is typical of well-known GPS systems, such as the GPS coordinates of the UAV 600. Such GPS data may be utilized by the UAV 600 for various functions. As such, the UAV may use its GPS receiver 606 to help navigate to the caller's location, as indicated, at least in part, by the GPS coordinates provided by their mobile device. Other examples are also possible.

UAV 600 may also include one or more imaging system(s) 608. For example, one or more still and/or video cameras may be utilized by a UAV 600 to capture image data from the UAV's environment. As a specific example, charge-coupled device (CCD) cameras or complementary metal-oxide-semiconductor (CMOS) cameras can be used with unmanned vehicles. Such imaging sensor(s) 608 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 600 may use its one or more imaging system 608 to help in determining location. For example, UAV 600 may capture imagery of its environment and compare it to what it expects to see in its environment given current estimated position (e.g., its current GPS coordinates), and refine its estimate of its position based on this comparison.

In a further aspect, UAV 600 may include one or more microphones. Such microphones may be configured to capture sound from the UAVs environment.

B. Navigation and Location Determination

The navigation module 615 may provide functionality that allows the UAV 600 to, e.g., move about in its environment and reach a desired location. To do so, the navigation module 615 may control the altitude and/or direction of flight by controlling the mechanical features of the UAV that affect flight (e.g., rotors 110 of UAV 100).

In order to navigate the UAV 600 to a target location, a navigation module 615 may implement various navigation techniques, such as map-based navigation and localization-based navigation, for instance. With map-based navigation, the UAV 600 may be provided with a map of its environment, which may then be used to navigate to a particular location on the map. With localization-based navigation, the UAV 600 may be capable of navigating in an unknown environment using localization. Localization-based navigation may involve a UAV 600 building its own map of its environment and calculating its position within the map and/or the position of objects in the environment. For example, as a UAV 600 moves throughout its environment, the UAV 600 may continuously use localization to update its map of the environment. This continuous mapping process may be referred to as simultaneous localization and mapping (SLAM). Other navigation techniques may also be utilized.

In some embodiments, the navigation module 615 may navigate using a technique that relies on waypoints. In particular, waypoints are sets of coordinates that identify points in physical space. For instance, an air-navigation waypoint may be defined by a certain latitude, longitude, and altitude. Accordingly, navigation module 615 may cause UAV 600 to move from waypoint to waypoint, in order to ultimately travel to a final destination (e.g., a final waypoint in a sequence of waypoints).

In a further aspect, navigation module 615 and/or other components and systems of UAV 600 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 600 may navigate to the general area of a person to whom an item is being delivered using waypoints. Such waypoints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 600 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 600 has navigated to the general area of the person or device. For instance, a UAV 600 may be equipped with one or more sensory systems, such as, for example, imaging system(s) 608, a directional microphone array (not shown), ultrasonic sensors 604, infrared sensors (not shown), and/or other sensors, which may provide input that the navigation module 615 utilizes to navigate autonomously or semi-autonomously to the specific location of a person.

As another example, once the UAV 600 reaches the general area of a target delivery location (or of a moving subject such as a person or their mobile device), the UAV 600 may switch to a "fly-by-wire" mode where it is controlled, at least in part, by a remote operator, who can navigate the UAV 600 to the specific location of the person in need. To this end, sensory data from the UAV 600 may be sent to the remote operator to assist them in navigating the UAV to the specific location. For example, the UAV 600 may stream a video feed or a sequence of still images from the UAV's imaging system(s) 608. Other examples are possible.

As yet another example, the UAV 600 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 600 to a particular person or a particular location, and might provide information to assist the passer-by in delivering the UAV 600 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 600 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 600 includes one or more communication systems 620. The communications systems 620 may include one or more wireless interfaces and/or one or more wireline interfaces, which allow UAV 600 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 600 may include communication systems 620 that allow for both short-range communication and long-range communication. For example, the UAV 600 may be configured for short-range communications using Bluetooth and for long-range communications under a CDMA protocol. In such an embodiment, the UAV 600 may be configured to function as a "hot spot;" or in other words, as a gateway or proxy between a remote support device and one or more data networks, such as cellular network and/or the Internet. Configured as such, the UAV 600 may facilitate data communications that the remote support device would otherwise be unable to perform by itself.

For example, UAV 600 may provide a WiFi connection to a remote device, and serve as a proxy or gateway to a cellular service provider's data network, which the UAV might connect to under an LTE or a 3G protocol, for instance. The UAV 600 could also serve as a proxy or gateway to a high-altitude balloon network, a satellite network, or a combination of these networks, among others, which a remote device might not be able to otherwise access.

D. Power Systems

In a further aspect, UAV 600 may include power system(s) 621. A power system 621 may include one or more batteries for providing power to the UAV 600. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 600 may employ various systems and configurations in order to transport items. In the illustrated embodiment, a payload 622 may serve as a compartment that can hold one or more items, such that a UAV 600 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

In some implementations, the payload 622 of a given UAV 600 may include or take the form of a "package" designed to transport medical-support items to a target delivery location. For example, a medical-support UAV may include a package with one or more items for medical support in the particular medical situation, and/or one or more medical-support modules 616 that are designed to provide medical support in the particular medical situation. In some cases, a UAV 600 may include a package that is designed for a particular medical situation such as choking, cardiac arrest, shock, asthma, drowning, etc. In other cases, a UAV 600 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 621 for power.

In some embodiments, a UAV 600 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 600 might function as a mobile defibrillator. Specifically, rather than carry a stand-alone defibrillator that can then be removed from the UAV for use, the UAV itself may function as a defibrillator.

F. Service Modules

As noted above, UAV 600 may include one or more service modules 916. The one or more service modules 616 include software, firmware, and/or hardware that may help to provide or assist in the provision of the UAV-related services.

Configured as such, a UAV 600 may provide various types of service. For instance, a UAV 600 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 600 may facilitate communication between a layperson and/or medical personnel at the scene and medical personnel at a remote location. As an example, a service module 616 may provide a user interface via which a person at the scene can use a communication system 620 of the UAV to communicate with an emergency medical technician at a remote location. As another example, the UAV 600 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

IV. Example System and Apparatus for Payload Delivery

Figure 7:
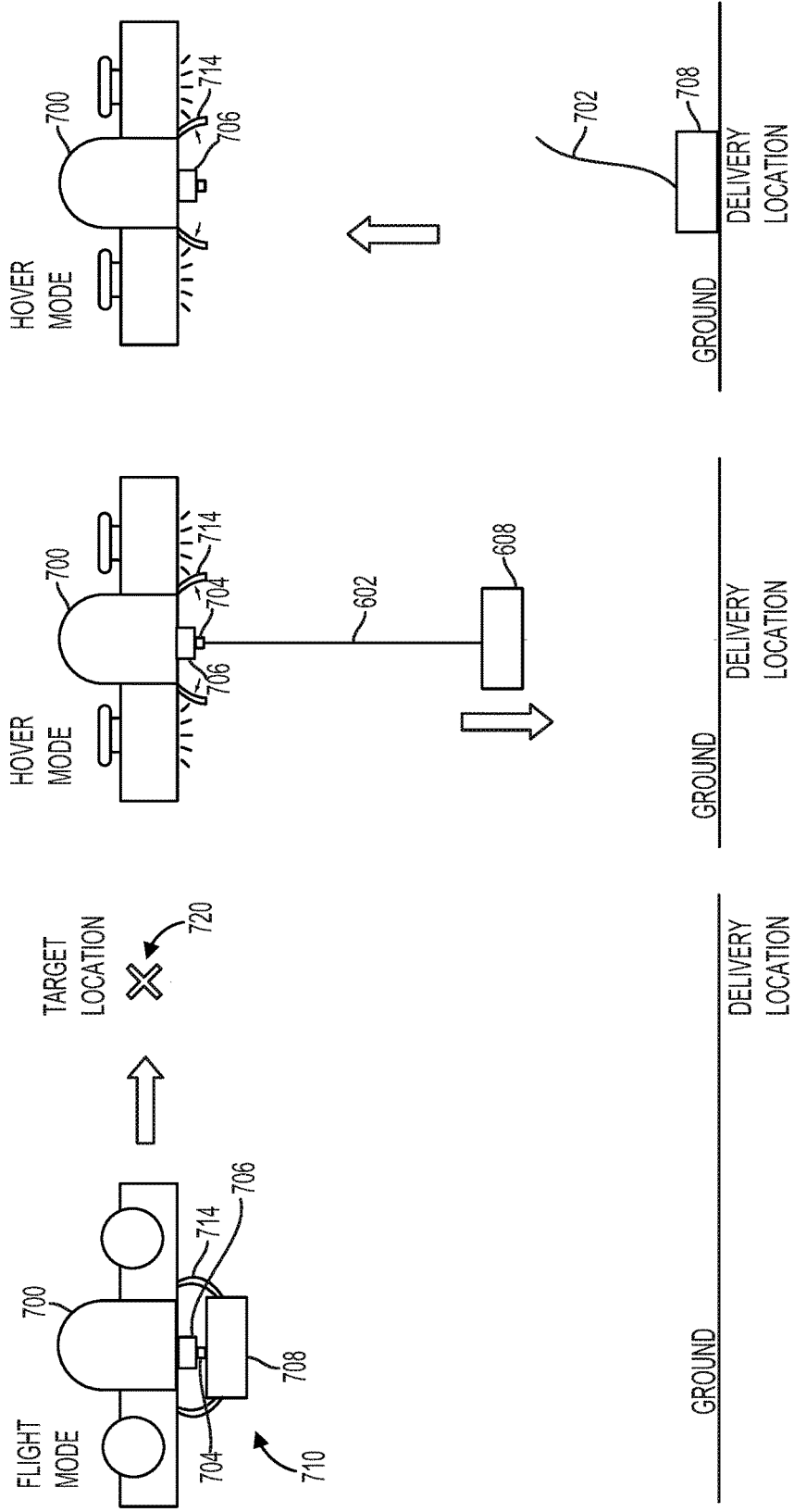
FIGS. 7A, 7B, and 7C show a UAV that includes a payload delivery apparatus, according to example embodiments.

FIGS. 7A, 7B, and 7C show a UAV 700 that includes a payload delivery system 710, according to an example embodiment. As shown, payload delivery system 710 for UAV 700 includes a tether 702, a payload delivery apparatus 704, a payload-release device 706, and a payload 708 coupled to the payload delivery apparatus 704 via tether 702. The payload-release device 706 can function to alternately secure payload 708 and release the payload 708 upon delivery. In some embodiments, the UAV 700 may not include the payload-release device 706, and the payload delivery apparatus may be coupled directly to the UAV 700.

In some embodiments, the payload delivery apparatus 704 can function to unwind the tether 702 such that the payload 708 can be lowered to the ground with tether 702 from UAV 700. The payload 708 may itself be an item for delivery, and may be housed within (or otherwise incorporate) a parcel, container, or other structure that is configured to interface with the payload-release device 706. In practice, the payload delivery system 710 of UAV 700 may function to autonomously lower payload 708 to the ground in a controlled manner to facilitate delivery of the payload 708 on the ground while the UAV 700 hovers above.

As shown in FIG. 7A, the payload delivery system 710 may function to hold the payload 708 against or close to the bottom of the UAV 700, or even inside the UAV 700, during flight from a launch site to a target location 720. The target location 720 may be a point in space directly above a desired delivery location. Then, when the UAV 700 reaches the target location 720, the UAV's control system may operate the payload delivery apparatus 704 such that the payload 708, secured by the payload delivery apparatus 704, is suspended by the tether 702 and lowered to the ground, as shown in FIG. 7B. After releasing payload 708, payload 708 may descend with the tether 702 until tether 702 unwinds off of the payload delivery apparatus 704, as shown in FIG. 7C.

In some embodiments, the control system may detect when the payload 708 has been lowered to be at or near the ground based on the length of the spool and the descent rate of the payload 708. In other embodiments, the control system may use various types of data, and various techniques, to determine when the payload 708 and/or payload-release device 706 have lowered to be at or near the ground. Further, the data that is used to determine when the payload 708 is at or near the ground may be provided by sensors on UAV 700, sensors on the payload-release device 706, and/or other data sources that provide data to the control system.

In some embodiments, the control system itself may be situated on the payload-release device 706 and/or on the UAV 700. For example, the payload-release device 706 may include logic module(s) implemented via hardware, software, and/or firmware that cause the payload-release device 706 to function as described herein, and the UAV 700 may include logic module(s) that communicate with the payload-release device 706 to cause the payload-release device 706 to perform functions described herein.

Figure 8:
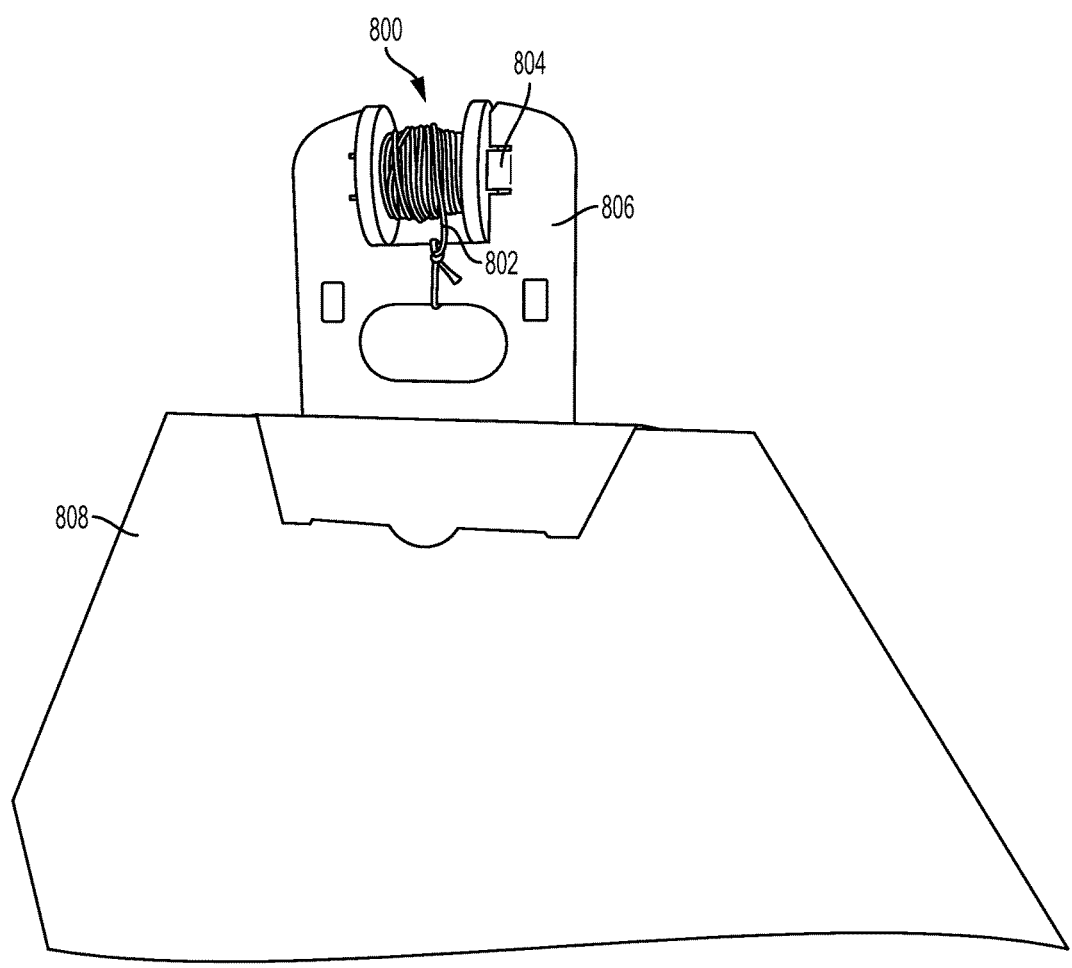
FIG. 8 is a simplified illustration of an example payload coupled to a spool of a payload delivery apparatus, according to example embodiments.

In some embodiments, payload delivery apparatus 704 may include a spool to unwind the tether 702 off of payload delivery apparatus 704. FIG. 8 shows an example payload 808 coupled to a spool 800 of a payload delivery apparatus via a tether 802. The payload delivery apparatus may be, for example, the payload delivery apparatus 404 shown in FIGS. 7A, 7B, and 7C, the payload delivery apparatus 1000 in FIG. 10, or the payload delivery apparatus 1100 in FIG. 11, which will be described in further detail herein.

As shown, the tether 802 may be coupled to a payload mount attachment 806. In some embodiments, the payload mount attachment 806 may be clipped to the spool 800 with cardboard tabs 804 to prevent spool 802 from unwinding during flight before reaching the delivery location. Cardboard tabs 804 may rest on the sides of spool 800, and may detach from the payload mount attachment 806 once the tether 802 starts unwinding the payload 808 to the ground. In some embodiments, the sides of spool 800 may be spring loaded or may include a spring loaded cover on top of spool 800. The spring loaded sides or cover may create enough friction to prevent spool 802 from unwinding during flight before reaching the delivery location. In further embodiments, the cardboard tabs 804 may couple or hold tether 802 in addition to resting on the sides of spool 800. In such arrangement, tether 802 may not hold any weight of the payload before descent, and thus, cardboard tabs 804 may prevent tether 802 from unwinding payload 808. When the payload is released for delivery (e.g., during descent), cardboard tabs 804 may be released from tether 802 (and spool 800), thereby allowing tether 802 to unwind payload 808 to the ground. Alternatively, payload mount attachment 806 may be clipped to the spool 800 with tape or other adhesives to prevent spool 802 from unwinding.

In some embodiments, the spool 800 may be cylindrical in shape, but other shapes may be possible. For example, the spool may be shaped like a gearbox or transmission commonly used in motor vehicles. To reduce cost, weight, and footprint of the payload delivery system, the spool 700 may be made of plastic, among other lightweight materials In another aspect, a payload delivery apparatus may not include a spool to further reduce cost, weight, and footprint. Instead, a payload delivery apparatus may include tether or a string wrapped around like a yarn ball. In operation, the tether or string may be tied to the payload to secure a payload during descent, and during descent, the tether or string may unwind and may be lowered with the payload.

In practice, the tether 802 used to suspend the payload 808 from a UAV (and a payload delivery apparatus) may be formed from a variety of materials. The tether 802 may include, for example, high tensile-strength polymeric fibers, metallic and/or synthetic cables, and other materials that exhibit relatively high tensile-strength per unit weight. The tether 802 may also be selected, at least in part, to be a material that is suitable for interfacing with a payload delivery apparatus. In some examples, the tether 802 may also be operable for transmitting information between a payload delivery apparatus and a UAV, or a payload-release device, such as payload-release device 706 in FIGS. 7A-7C, and a UAV. For instance, the tether 802 may include, or be coupled to, a data-transmission wire formed of a conductive material (e.g., for conveying data-encoded electrical signals) and/or a fiber optic line (e.g., for conveying data-encoded optical signals).

In some embodiments the payload 808 may be a standardized container or parcel that includes one or more features to couple the payload 808 to the spool 800 of a payload delivery apparatus. For instance, the payload 808 may include one or more loops, indentations, tabs, anchor points, or other structural features arranged to be engaged by corresponding components of a payload delivery apparatus, such as the spool 800 and the tether 802. In some cases, the standardized features of the payload 808 may be integrated in a packaging module (e.g., a reusable or disposable container), and the packaging module may house (or be fastened to) one or more items that are being delivered using a UAV. Such items may include food, medical equipment or supplies, retail goods, relief items, or any other items that may be delivered by a delivery service. In some cases, the delivered items may be supplied to stranded or isolated people in an emergency or rescue scenario. In some cases, the payload 808 may also include an identifying element to facilitate recognition and/or differentiation of the payload 808 from other payloads when being sorted and handled. The identifying element may include an RFID tag or an optically scanned linear or two-dimensional barcode. The identifying element can then be associated with information regarding the particular payload in a database that can be accessed by various systems used in handling/sorting payloads, and in loading a UAV. For example, such a database may associate the identifying element with contents of a payload, delivery destination, and/or other information pertaining to the particular payload and its delivery. Systems interfacing with a given payload can then scan its identifying element and retrieve the information from the database that relates to the given payload.

In some examples, the payload 808 may take the form of a container that includes medical-support devices and/or other items intended to help in a medical situation. In other examples, the payload 808 may itself be a medical-support device (e.g., a defibrillator) or another type of medical support item, such as a pharmaceutical medicine. Generally, the payload 808 may include any type of item to be delivered, including non-medical items such as goods ordered from a non-medical delivery service or items shipped through a shipping service. For example, the payload 808 may take the form of a container that includes retail goods, food, or any other item that may be delivered. In other examples, the payload 808 may itself be a retail good (e.g., clothing, toy, book).

FIGS. 9A, 9B, 9C, and 9D illustrate alternative configurations of how a payload, such as payload 808, may be coupled to a tether via a payload mount attachment. Each of the payload mount attachments described herein may be formed of a rigid or semi-rigid material, such as metal, plastic, composite materials, and/or paper-based substrates.

Figure 9A:
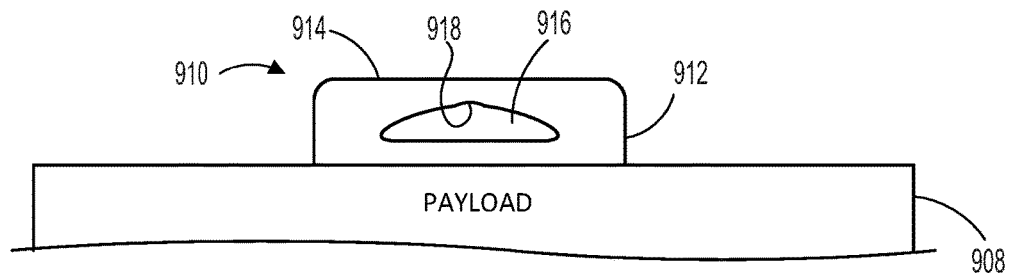
FIGS. 9A, 9B, 9C, and 9D illustrate alternate payload mount attachment configurations, according to example embodiments.

In FIG. 9A, a payload mount attachment 910 situated on a top surface of a payload 908. The payload mount attachment 910 can include a structure 912 that extends from the top surface of the payload 908. The structure 912 can have an aperture 916 for receiving tether while the structure 912 is coupled to a payload delivery apparatus via a spool and/or inserted into a channel of a payload-release device. The aperture 916 may be roughly triangular, as shown in FIG. 9A, which may help in accounting for various alignment offsets. The aperture 916 can have a rim 918. Payload 908 may naturally move to the location along the rim that is furthest from the top surface of the payload 908 (e.g., the apex of the triangular aperture 916) before and/or during descent to the ground for delivery.

Figure 9B:
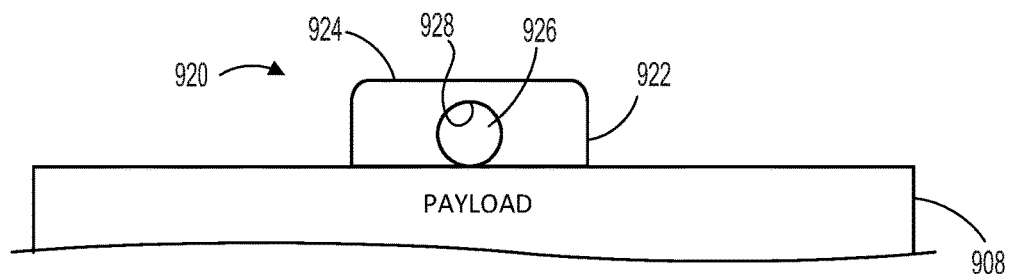

In FIG. 9B, another payload mount attachment 920 is situated on a top surface of the payload 909. The payload mount attachment 920 can include a structure 922 that extends from the top surface of the payload 908. The structure 922 can have a circular aperture 926 for receiving tether while the structure 922 is coupled to a payload delivery apparatus via a spool and/or inserted into a channel of a payload-release device. The aperture 926 can have a rim 928. Payload 909 may naturally move to the location along the rim that is furthest from the top surface of the payload 908 (e.g., the apex of the aperture 926) before and/or during descent to the ground for delivery.

Figure 9C:
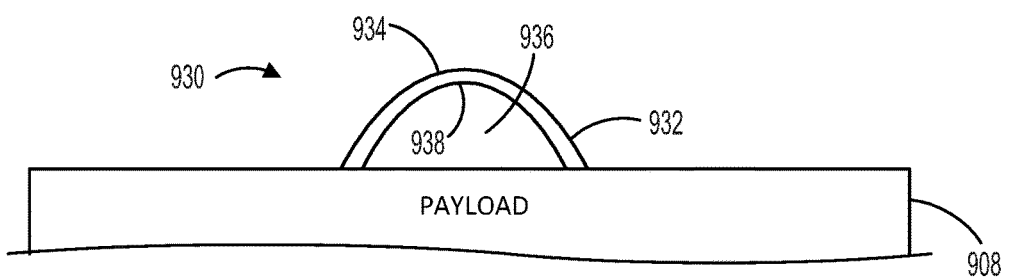

In FIG. 9C, another payload mount attachment 930 is situated on a top surface of the payload 908. The payload mount attachment 930 can include a structure 932 that extends from the top surface of the payload 908. The structure 932 can be a length of material anchored at both ends to the top surface of the payload 908, such as a length of rope, wire, plastic, etc. Between the anchored ends, the structure 932 can encompass an area 936 for receiving tether while the structure 932 is coupled to a payload delivery apparatus via a spool and/or inserted into a channel of a payload-release device. The area 936 can have a rim 938. Payload 908 may naturally move to the location along the rim that is furthest from the top surface of the payload 908 (e.g., the apex of the area 936) before and/or during descent to the ground for delivery.

Figure 9D:
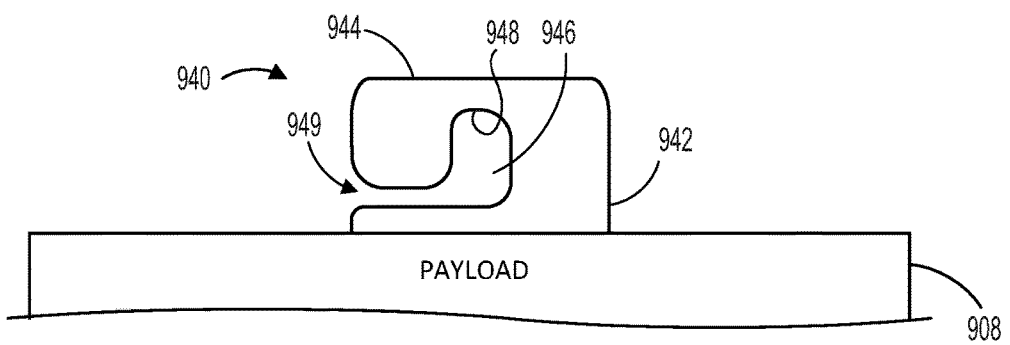

In FIG. 9D, another payload mount attachment 940 is situated on a top surface of the payload 908. The payload mount attachment 940 can include a hook structure 942 that extends from the top surface of the payload 908. The hook structure 942 can have an interior channel 946 that includes an opening 949 through a side edge of the hook structure 942. The interior channel 946 can be configured for receiving tether while the structure 942 is coupled to a payload delivery apparatus via a spool and/or inserted into a channel of a payload-release device. The channel 946 can have a rim 948. Payload 908 may naturally move to the location along the rim that is furthest from the top surface of the payload 908 (e.g., the apex of the channel 946) before and/or during descent to the ground for delivery.

Figure 10:
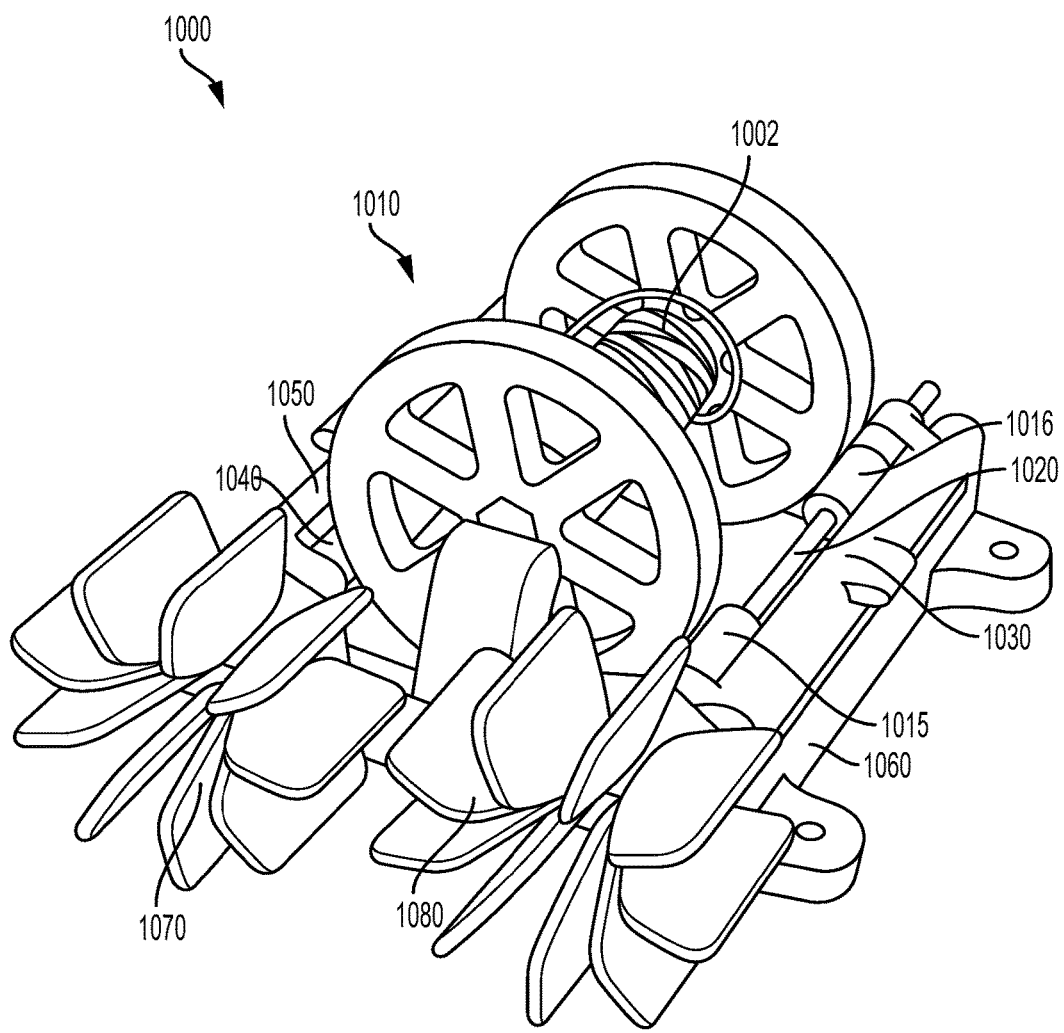
FIG. 10 is an example payload delivery apparatus in a resting position, according to example embodiments.

FIG. 10 is an example payload delivery apparatus 1000 in a resting position, according to example embodiments. The payload delivery apparatus 1000 may be in a resting position when a UAV, such as UAV 700, is in flight mode or in hover mode. Additionally, the payload delivery apparatus 1000 may be in a resting position while a payload, coupled to the payload delivery apparatus 1000 via tether 1002, descends from a UAV.

In some embodiments, the payload delivery apparatus 1000 may include a support structure 1060 that keeps the components of the payload delivery apparatus 1000 together. A shaft 1020 may be coupled to the support structure via a swing arm 1030. The swing arm 1030 may be coupled in a manner such that it allows upward movement, and restricts downward movement of, the shaft 1020 from a resting position. In some embodiments, the payload delivery apparatus 1000 may include the shaft 1020 coupled to the swing arm 1030, and another opposable shaft 1040 coupled to another swing arm 1050. In such configuration, swing arm 1030 and 1050 may be configured to allow upward movement, and restrict downward movement of, the shaft 1020 and 1040 from the resting position. Alternatively, the payload delivery apparatus 1000 may include shaft 1020 coupled to the swing arm 1030, and another shaft 1040 coupled directly to the support structure 1060 instead of the shaft 1050. Other examples are possible. In some embodiments, the shaft 1020 and/or shaft 1040 may include rubber 1015 and 1016 on the ends of each shaft.

In another embodiment, the payload delivery apparatus 1000 may include a sliding mechanism instead of swing arm 1030, 1050. The sliding mechanism may be, for example, any mechanism that allows spool 1002 to slide through the bottom opening of support structure 1060, allows upward movement, and restricts downward movement of, shaft 1020 and/or 1040 from the resting position, and locks spool 1002 into the resting position after spool 1002 slides through the bottom opening of support structure 1060.

In another embodiment, fan 1070 and/or 1080 may be coupled to the shaft 1020 and/or shaft 1040. Although FIG. 10 shows two fans 1070 and 1080 coupled to two shafts 1020 and 1040, the payload delivery system may include two fans 1070 and 1080 coupled to one of the shafts 1020 or 1040. Alternatively, the payload delivery system may include a single fan 1070 or 1080 coupled to a single shaft 1020 or 1040. In other examples, the payload delivery system may include a single fan 1070 or 1080 coupled to two shafts 1020 and 1040. Other example configurations are possible. As described above, to reduce cost, weight, and footprint of the payload delivery apparatus 1000, the fan 1070 and/or 1080 may be a passive component made of plastic, among other lightweight materials.

Additionally, the fan 1070 and/or 1080 may be enclosed in a housing to protect the fan 1070 and/or 1080 from environmental conditions while the UAV is in flight or hover mode. In some embodiments, the payload delivery apparatus 1000 may be entirely enclosed in a housing to protect the fan 1070 and/or 1080. In other embodiments, the payload delivery apparatus 1000 may be partially enclosed to protect the fan 1070 and/or 1080. In some other embodiments, payload delivery apparatus 1000 may enclose all or part of the components described herein. Other examples are possible.

In operation, when a payload is released from a UAV via the payload delivery apparatus 1000, the shaft 1030 and/or shaft 1040 may act as a friction drive or a friction engine. The spool 1010 may transfer power to shaft 1030 and/or 1040, and spool 1010 may then rotate and unwind the tether 1002 to lower the payload to the ground for delivery. In some embodiments, the spool 1010 may unwind the tether 1002 (coupled to a payload) in a manner similar to the spool 700 in FIG. 7. As described above, the spool 1010 may be cylindrically shaped or in any other shape so as to rest on the shaft 1020 and/or shaft 1040 when the payload delivery apparatus 1000 is in the resting position.

In some embodiments, the spool 1010 and shaft 1030 and/or shaft 1040 may be made of plastic and/or other passive (non-powered) materials. Together, the spool 1010 and shaft 1030 and/or shaft 1040 may function like a traditional gearbox, ensuring that fan 1070 and/or 1080 rotate at the desired speed. While the payload descends from a UAV, fan 1070 and/or 1080 may dissipate the potential energy possessed by the payload when it was held from the UAV. The fan 1070 and/or 1080 may control the rate at which it dissipates the potential energy in a polynomial or quadratic manner, rather than a linear manner, so that a payload that weighs twice as much as another payload does not descend twice as fast as the other payload. Controlling the speed or descent rate of the payload in such manner ensures consistent and stable delivery of the payload to the ground (i.e. keeps the payload intact), which further enhances a user or customer's experience.

Although fan 1070 and/or 1080 is preferable to reduce the cost, weight, and footprint of a UAV, the payload delivery apparatus 1000 may include an electric motor (e.g., a DC motor), instead of the fan 1070 and/or 1080. The electric motor can be controlled by a control system of a UAV or can be actively controlled by a servomechanism (also referred to as a "servo") and a microcontroller. The microcontroller may output a desired operating rate (e.g., a desired RPM), which may correspond to the speed at which a payload should be lowered towards the ground. The servo may then ensure that a payload is lowered at a desired rate. Other examples of speed control components are possible, including slip clutches, fluid dampers, among others.

After a payload is delivered (and tether 1002 fully unwinds off of the spool 1010), the payload delivery system 1000 may need to replace the empty spool with a new spool. Additionally, a new payload may need to be tied to the new spool and replace the empty spool resting on the payload deliver system 1000. In operation, for example, the UAV may need to navigate back to the distribution center to load a new payload and then navigate to a new delivery location. To simplify this process, a new spool that is pre-attached to a new payload (via a new tether) may be pushed into the position of the empty spool, thereby removing the empty spool and replacing the empty spool in one step. This loading mechanism and process significantly reduces the cost and time for a UAV to deliver payloads and load new payloads for delivery.

Figure 11A:
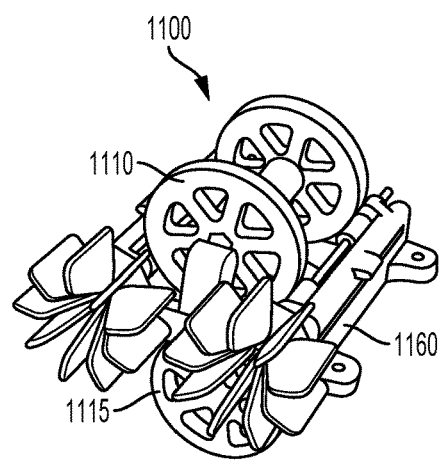
FIGS. 11A, 11B, and 11C show an example payload delivery apparatus replacing an empty spool with a new spool, according to example embodiments.
Figure 11B:
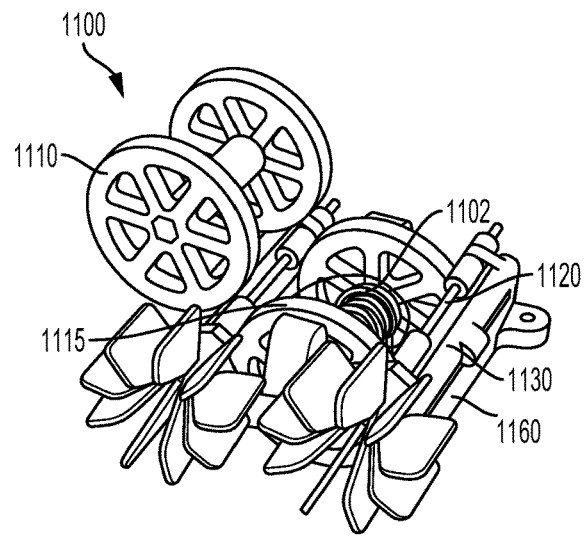
Figure 11C:
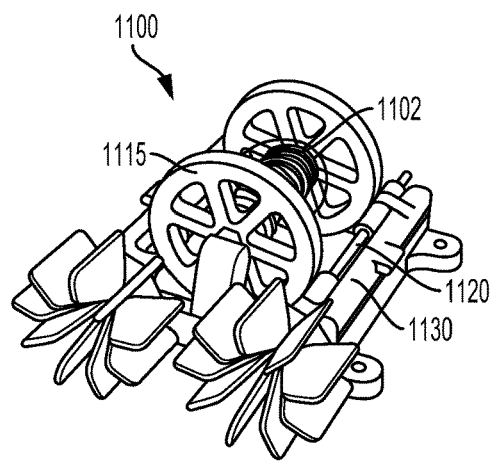

FIGS. 11A-C illustrate an example payload delivery apparatus 1100 replacing an empty spool 1110 (without tether) with a new spool 1115 (with tether 1102) after a payload is delivered. The payload delivery apparatus 1100 may be configured similarly to payload delivery apparatus 900. As shown in FIG. 11A, the new spool 1115 (with tether 1102) is inserted from below through an opening in the support structure 1160. Although the new spool 1115 in FIG. 11A is in the same cylindrical shape as the empty spool 1110, the new spool 1115 may be in any other shape so as to be inserted from below through the opening in the support structure 1160.

In FIG. 11B, while the new spool 1115 (with tether 1102) passes through the opening of the support structure 1160, the shaft 1120 (coupled to the support structure 1160 via the swing arm 1130) swings upward to remove the empty spool 1110 from the payload delivery apparatus 1100. As described above for payload delivery apparatus 900, the payload delivery apparatus 1100 may have more than one shaft coupled to the support structure 1160 via more than one swing arm.

In FIG. 11C, after the new spool 1115 passes through the opening of the support structure 1160 (and removes the empty spool 1110), the shaft 1120 may move back to its resting position, so that the new spool 1115 rests on the shaft 1120. In such configuration, payload delivery apparatus 1100 is back in the resting position similar to payload delivery apparatus 900. Although not shown in FIG. 11C, the new spool 1115 may include tether 1102 that is pre-attached to a payload similar to the spool 700 with tether 702 in FIG. 7.

Figure 12A:
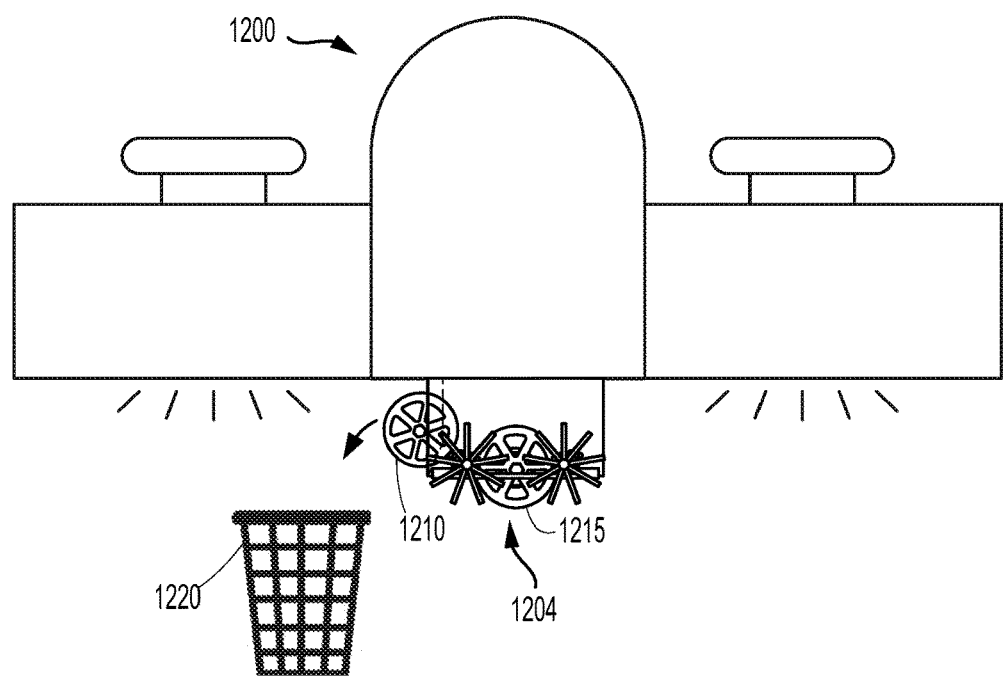
FIGS. 12A, 12B, and 12C show additional examples of a payload delivery apparatus replacing an empty spool with a new spool, according to example embodiments.
Figure 12B:
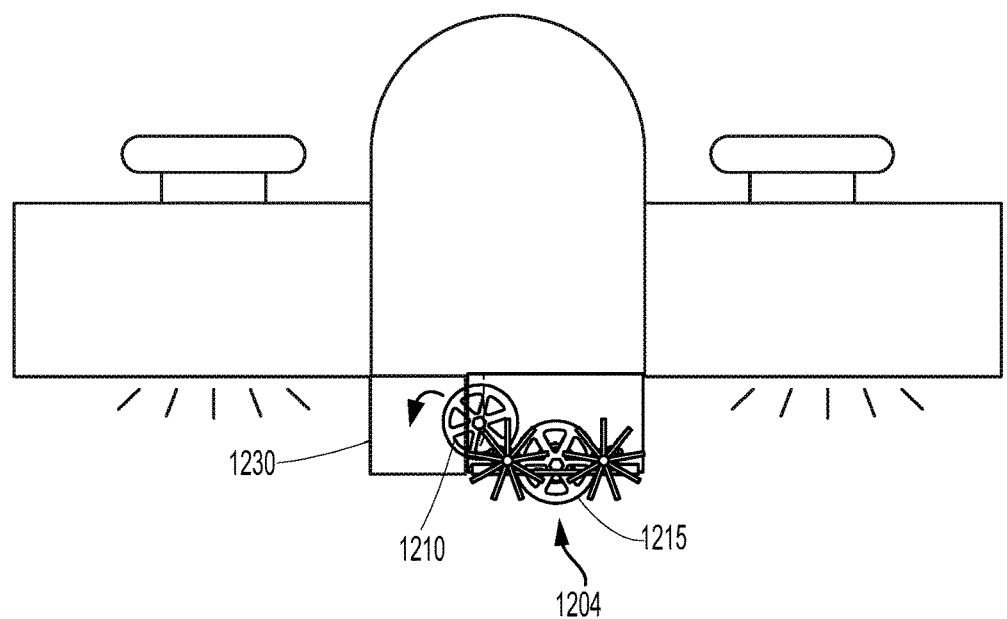
Figure 12C:
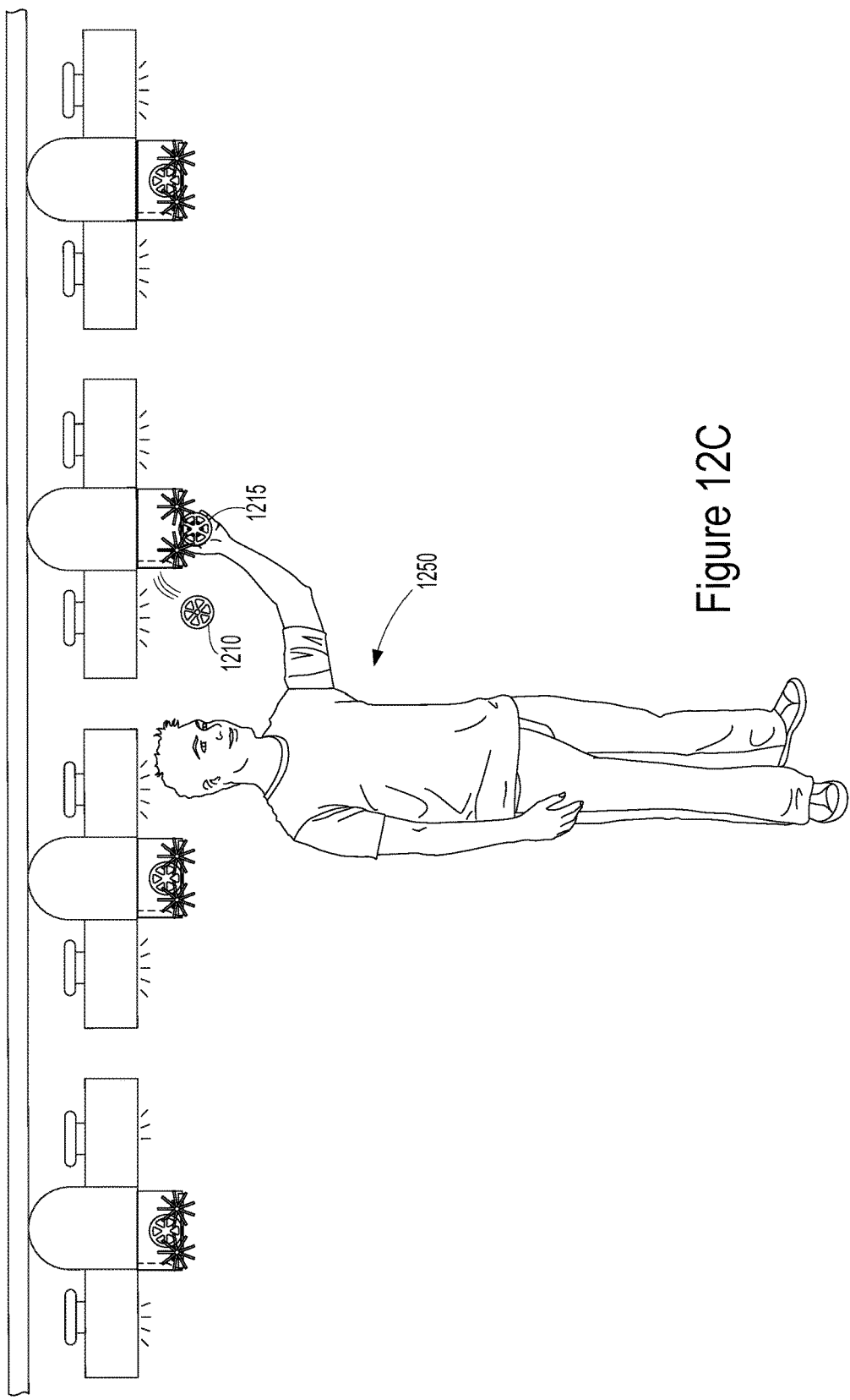

FIGS. 12A-C illustrate example operations of a payload delivery apparatus 1204 replacing an empty spool 1210 with a new spool 1215. As shown in FIG. 12A, payload delivery apparatus 1204 may be coupled to the bottom of UAV 1200 similar to payload delivery apparatus 604 in FIGS. 6A-6C. The bottom of UAV 1200 includes an opening to insert new spool 1215 into the bottom opening of the payload delivery apparatus 1204. UAV 1200 further includes an opening to dump the empty spool 1210 into a recycle bin 1220 near the UAV when new spool 1215 is pushed into its place as described in FIGS. 10A-10C.

Additionally or alternatively, as shown in FIG. 12B, UAV 1200 may include an internal storage area 1230. When new spool 1215 is pushed into position of empty spool 1210, empty spool 1210 may be dumped or stored in internal storage area 1230. Internal storage area 1230 may be of any size, large enough to store as many empty spools as desired.

To further illustrate this process, FIG. 12C shows a person 1250 removing the empty spool 1210 and loading new spool 1215 in one step. As shown, this simplified process allows person 1250 to efficiently remove empty spool 1210 and load new spool 1215 (with payload pre-attached) for multiple UAVs.

V. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. An apparatus comprising:
   a support structure;
   at least one shaft coupled to the support structure via at least one swing arm, wherein the swing arm allows upward movement, and restricts downward movement, of the at least one shaft from a resting position;
   a spool, wherein in the spool is shaped so as to rest on the at least one shaft when the at least one shaft is in the resting position, and wherein the spool is operable to unwind a tether coupled to a payload;
   at least one fan coupled to the at least one shaft, wherein rotation of the spool when unwinding the tether also causes rotation of the at least one fan coupled to the at least one shaft, thereby controlling a descent rate of the payload;
   wherein the spool is shaped so as to be inserted from below through an opening in the support structure; and
   wherein the at least one swing arm is configured to (i) move the at least one shaft upward while the spool passes through the opening of the support structure and (ii) move the at least one shaft back to the resting position so that the spool rests on the at least one shaft.

2. The apparatus of claim 1, further comprising:
   wherein the at least one shaft comprises a first shaft and a second shaft and the at least one swing arm comprises a first swing arm and a second swing arm;
   wherein the first shaft is coupled to the support structure via the first swing arm, and wherein the first swing arm allows upward movement, and restricts downward movement, of the first shaft from the resting position; and
   wherein the second shaft is coupled to the support structure via the second swing arm, and wherein the second swing arm allows upward movement, and restricts downward movement, of the second shaft from the resting position.

3. The apparatus of claim 2, wherein the at least one fan comprises a first fan and a second fan, and wherein the first fan is coupled to the first shaft and the second fan is coupled to the second shaft.

4. The apparatus of claim 1, further comprising:
   wherein the at least one shaft comprises a single shaft and the at least one swing arm comprises a single swing arm; and
   wherein the single shaft is coupled to the support structure via the at least one swing arm, and wherein the at least one swing arm allows upward movement, and restricts downward movement, of the single shaft from the resting position.

5. The apparatus of claim 1, wherein the at least one shaft comprises rubber ends coupled to each end of each shaft to support the spool in the resting position of the at least one shaft.

6. The apparatus of claim 1, wherein the at least one fan is configured to control the descent rate of the payload in a manner such that the descent rate does not increase linearly with respect to the weight of the payload.

7. The apparatus of claim 1 further comprising:

a housing unit that encloses at least the at least one fan to protect the at least one fan from environmental conditions, wherein the at least one fan comprises plastic.

8. The apparatus of claim 1, wherein the payload comprises at least one cardboard tab attached to the spool and the tether to secure the payload before descent, and wherein the at least one cardboard tab detaches from the spool upon descent.

9. An apparatus comprising:

a support structure;

at least one shaft coupled to the support structure via at least one swing arm, wherein the swing arm allows upward movement, and restricts downward movement, of the at least one shaft from a resting position;

a spool, wherein the spool is shaped so as to rest on the at least one shaft when the at least one shaft is in the resting position, and wherein the spool is operable to unwind a tether coupled to a payload; and wherein the at least one swing arm is configured to (i) move the at least one shaft upward while the spool passes through an opening of the support structure and (i) move the at least one shaft back to the resting position so that the spool rests on the at least one shaft.

10. The apparatus of claim 9 further comprising:

at least one fan coupled to the at least one shaft, wherein rotation of the spool when unwinding the tether also causes rotation of the at least one fan coupled to the at least one shaft, thereby controlling a descent rate of the payload.

11. The apparatus of claim 10 further comprising:

a housing unit that encloses at least the at least one fan to protect the at least one fan from environmental conditions, wherein the at least one fan comprises plastic.

12. The apparatus of claim 9 further comprising at least one electric motor coupled to the at least one shaft, wherein the electric motor controls a descent rate of the payload coupled to the tether.

13. The apparatus of claim 9, further comprising:

wherein the at least one shaft comprises a first shaft and a second shaft and the at least one swing arm comprises a first swing arm and a second swing arm;

wherein the first shaft is coupled to the support structure via the first swing arm, and wherein the first swing arm allows upward movement, and restricts downward movement, of the first shaft from the resting position; and wherein the second shaft is coupled to the support structure via the second swing arm, and wherein the second swing arm allows upward movement, and restricts downward movement, of the second shaft from the resting position.

14. The apparatus of claim 9, further comprising:

wherein the at least one shaft comprises a single shaft and the at least one swing arm comprises a single swing arm; and wherein the single shaft is coupled to the support structure via the single swing arm, and wherein the single swing arm allows upward movement, and restricts downward movement, of the single shaft from the resting position.

15. The apparatus of claim 9, wherein the at least one shaft comprises rubber ends coupled to each end of each shaft to support the spool in the resting position of the at least one shaft.

* * * * *